(12) United States Patent
Autès et al.

(10) Patent No.: US 11,961,300 B2
(45) Date of Patent: Apr. 16, 2024

(54) DYNAMIC MEDIA CONTENT CATEGORIZATION METHOD

(71) Applicant: ECOLE POLYTECHNIQUE FEDERALE DE LAUSANNE (EPFL), Lausanne (CH)

(72) Inventors: Gabriel Autès, Lausanne (CH); Sami Arpa, Lausanne (CH); Sabine Süsstrunk, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 383 days.

(21) Appl. No.: 17/607,393

(22) PCT Filed: Apr. 29, 2019

(86) PCT No.: PCT/IB2019/053484
§ 371 (c)(1),
(2) Date: Oct. 28, 2021

(87) PCT Pub. No.: WO2020/222027
PCT Pub. Date: Nov. 5, 2020

(65) Prior Publication Data
US 2022/0207864 A1   Jun. 30, 2022

(51) Int. Cl.
*G06V 10/00*   (2022.01)
*G06V 10/44*   (2022.01)
(Continued)

(52) U.S. Cl.
CPC ............ *G06V 20/47* (2022.01); *G06V 10/454* (2022.01); *G06V 10/765* (2022.01); *G06V 10/82* (2022.01); *G06V 20/40* (2022.01)

(58) Field of Classification Search
CPC ............ G06N 3/02; G06N 3/08; G06N 3/045; G06N 3/092; G06N 3/0475; G06N 3/042;
(Continued)

(56) References Cited

U.S. PATENT DOCUMENTS

| 6,650,779 B2 * | 11/2003 | Vachtesvanos | G06V 10/52 |
| | | | 382/218 |
| 7,668,376 B2 * | 2/2010 | Lin | G06F 18/254 |
| | | | 382/190 |

(Continued)

FOREIGN PATENT DOCUMENTS

| CN | 106778590 A | 5/2017 |
| CN | 108229262 A | 6/2018 |
| CN | 109359636 A | 2/2019 |

OTHER PUBLICATIONS

D. P. Kingma and J. Ba, "Adam: A Method for Stochastic Optimization," ArXiv14126980 Cs, Dec. 2014.
(Continued)

*Primary Examiner* — Amir Alavi
(74) *Attorney, Agent, or Firm* — Maschoff Brennan (57) ABSTRACT

A method of classifying a media includes receiving a media file and extracting therefrom first and second data streams including first and second media content, respectively, the media content being associated with the media item. First and second feature vectors describing the first and second media content, respectively, are generated. At least a first single feature vector representing the first sequence of first feature vectors and the second sequence of second feature vectors is generated, or at least a first single feature vector representing at least the first sequence of first feature vectors is generated. A second feature vector representing at least the second sequence of second feature vectors is generated. A probability vector from the first single feature vector, or from the first and second single feature vectors is generated.
(Continued)

A user profile suitability class is assigned to the media item based on the probability vector.

24 Claims, 3 Drawing Sheets

(51) Int. Cl.
    *G06V 10/764*      (2022.01)
    *G06V 10/82*      (2022.01)
    *G06V 20/40*      (2022.01)

(58) Field of Classification Search
CPC ...... G06N 3/0464; G06V 20/47; G06V 20/40; G06V 10/454; G06V 10/765; G06V 10/82; G06V 10/764; G06F 18/254; G06F 18/24; G06F 18/241; G06F 18/2413; G06F 18/245; G06T 2207/20081; G06T 2207/20084; G06T 3/4046; G06T 9/002
See application file for complete search history.

(56) References Cited

U.S. PATENT DOCUMENTS

| | | | | |
|---|---|---|---|---|
| 9,135,103 | B2* | 9/2015 | Huang | G11C 29/56008 |
| 10,262,240 | B2* | 4/2019 | Guo | G06V 10/764 |
| 10,832,129 | B2* | 11/2020 | Fukuda | G10L 15/16 |
| 10,909,459 | B2* | 2/2021 | Tsatsin | G06N 3/045 |
| 11,196,400 | B2* | 12/2021 | Kim | G06V 10/764 |
| 11,461,554 | B2* | 10/2022 | Shen | G16H 20/00 |
| 2017/0289624 | A1 | 10/2017 | Avila et al. | |
| 2018/0249168 | A1* | 8/2018 | Loyd | H04N 21/422 |
| 2019/0273510 | A1* | 9/2019 | Elkind | H03M 7/4093 |
| 2020/0387783 | A1* | 12/2020 | Bagherinezhad | G06F 16/90335 |
| 2021/0192220 | A1 | 6/2021 | Qu et al. | |
| 2022/0207864 | A1* | 6/2022 | Autès | G06V 20/47 |

OTHER PUBLICATIONS

Wen-Nung Lie, et al., "News Video Classification Based on Multi-modal Information Fusion," IEEE International Conference on Image Processing 2005, (2005).

Theodoros Giannakopoulos, et al., "A Multimodal Approach to Violence Detection in Video Sharing Sites," 2010 20th International Conference on Pattern Recognition, pp. 3244-3247 (2010).

Qi Dai, et al., "Fudan-Huawei at MediaEval 2015: Detecting Violent Scenes and Affective Impact in Movies with Deep Learning," MediaEval, (2015).

EP Office Action dated Nov. 22, 2023 as received in Application No. 19729353.3.

Yashar Deldjoo et al., "Audio-visual encoding of multimedia content for enhancing movie recommendations." Recommender Systems, ACM, 2 Penn Plaza, Suite 701New YorkNY10121-0701USA, Sep. 27, 2018 (Sep. 27, 2018), pp. 455-459, XP058415609.

Suhang, Wang et al., "What Your Images Reveal" World Wide Web, International World Wide Web Conferences Steering Committee, Republic and Canton of Geneva Swizterland, Apr. 3, 2017 (Apr. 3, 2017), pp. 391-400, XP058327282.

Chu Wei-Ta et al: "A hybrid recommendation system considering visual information for predicting favorite restaurants", World Wide Web, Baltzer Science Publishers, Bussum, NL, vol. 20,No. 6, Jan. 20, 2017 (Jan. 20, 2017), pp. 1313-1331, XP036305531.

Alessandro Suglia et al., "A Deep Architecture for Content-based Recommendations Exploiting Recurrent Neural Networks", Proceedings of the 25th Conference on User Modeling, Adaptation and Personalization, UPMAP'17, Jan. 1, 2017 (Jan. 1, 2017), pp. 201-211, XP055656923.

* cited by examiner

DYNAMIC MEDIA CONTENT CATEGORIZATION METHOD

TECHNICAL FIELD

The present invention relates to the field of computer vision and deep learning, and more particularly to a method for dynamically and automatically assessing the content of a media item, such as a video, and for labelling the content based on the assessed content by using a set of artificial neural networks. The labelling may be used to determine an age suitability rating for the content. The present invention also relates to a system for implementing the method.

BACKGROUND OF THE INVENTION

Motion picture age ratings have been and still are a very important issue for the film, tv and video game industries. In most countries, under the pressure of social norm or governmental regulations, films must receive an age rating before being released to the public. Depending on the country, these ratings can range from being purely advisory to being legally restricting. For example, in the United States, films receive a rating given by the Motion Picture Association of America (MPAA), which is a trade association representing the major film studios of the country. While this rating is not mandatory, most theatres do not show films which have not received a seal of approval from the MPAA. In other countries including France and Singapore, these ratings are mandatory and must be obtained from a governmental agency before a film release. The process under which these ratings are obtained is substantially the same in all countries: the films are shown to a panel of experts who release a rating under their own set of rules. In some countries, the content provider can appeal or modify the film following the experts' ruling to obtain a lower restriction and thus reach a wider audience.

With the rise of streaming platforms, video-on-demand applications and content sharing websites, the need for assessing the suitability of a video content for a given age group has become even more critical. In particular, on social networks and video sharing platforms, the amount of user generated content is too vast to allow ratings by humans. For this user generated content, regulations are almost non-existent. The assessment of the suitability of content is left to the discretion of the platform, which sets up its own rules and methods for classifying or censoring videos. Video streaming service providers rely on their own experts or on user generated ratings. Other platforms hire content moderators whose task is to watch posted videos and decide if they should be age-restricted or removed. Some service providers also use some kinds of automated systems for detecting content violating their terms of service.

Deep artificial neural networks have been successfully used to classify video content according to their genre and action content. Similarly, deep neural network can perform text classification. The detection of disturbing content has been so far limited to specific types of sensitive material, such as the presence of violence or adult content. Nevertheless, the specific task of age rating detection goes beyond the detection of violent and pornographic content. In particular, profanities, mature topics and substance abuse can all result in a higher age rating in many countries. It is also to be noted that most of the existing solutions that use deep learning for sensitive content detection concentrate on the task of detecting a specific type of content, such as violence or pornography. Some other solutions use diverse low-level feature descriptors from audio, video and text inputs to filter sensitive media. However, these solutions often classify content only in two classes (sensitive or non-sensitive content).

SUMMARY OF THE INVENTION

It is an object of the present invention to overcome at least some of the problems identified above relating to classifying media content.

According to a first aspect of the invention, there is provided a method of classifying a media item into a user profile suitability class as recited in claim 1.

In this context, the present invention discloses a new computer-implemented method based on deep artificial neural networks to assign e.g. age suitability classes or ratings to media content. The present invention is superior to the 'panel of expert' or 'user generated' methods in several ways:

quicker and cheaper: the ratings can be computed much quicker than the time required to watch the film and the method does not require hiring experts.

automation: this advantage is important for providers with so much video content that the assessment by humans would not be feasible.

country/region specific algorithm: the present invention can learn the age rating principles specific to different cultures and countries. A film studio can directly assess the certification their movie will obtain in different parts of the world without hiring external experts.

Furthermore, the proposed computer-implemented solution allows the age suitability to be dynamically assessed as it varies through the sub-content (which are different sections of the content). For example, the proposed solution allows the age rating per scene to be detected, and thanks to the solution, it can be identified which parts of a video contribute to a specific rating. This advantage can be used to modify the film to obtain a desired rating. For example, the proposed solution could identify which scene of a film results in an R rating and allow creation of a cut or modified version suitable for younger audience. It is also to be noted that the present solution, which is based on convolutional neural networks, does not require crafting of low-level features. Moreover, beyond classifying into sensitive/non-sensitive content, the proposed solution can provide specific age suitability ratings in a detailed classification system.

According to a second aspect of the invention, there is provided a computer program product comprising instructions stored on a non-transitory medium for implementing the steps of the method when loaded and run on computing means of an electronic device.

According to a third aspect of the invention, there is provided a system configured for carrying out the method.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

DETAILED DESCRIPTION OF AN EMBODIMENT OF THE INVENTION

An embodiment of the present invention will now be described in detail with reference to the attached figures. The embodiment is used to dynamically classify media or multimedia content into one or more user profile suitability classes but the teachings of the present invention could instead be applied to other data classification tasks as well. The user profile suitability classes are in the embodiment explained below user or viewer age suitability classes. Identical or corresponding functional and structural elements that appear in the different drawings are assigned the same reference numerals.

Figure 1:
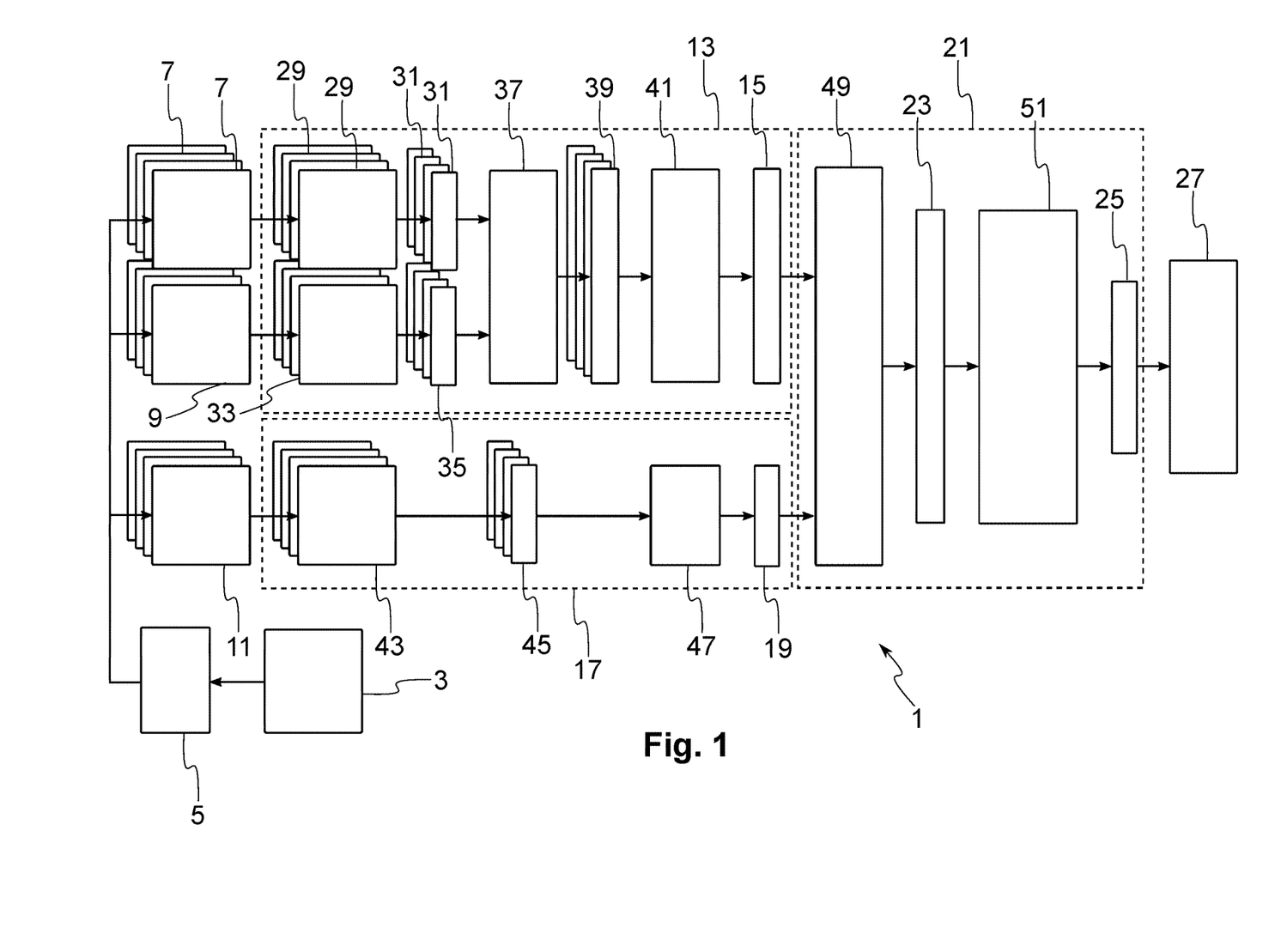
FIG. 1 is a block diagram schematically illustrating a classification system according to an example of the present invention.

The block diagram of FIG. 1 schematically illustrates a media item classification or labelling network or system 1 according to an embodiment of the present invention. The proposed system in this example is used for dynamically classifying video scenes as will be explained later in more detail. In the present description, the word "video" may be understood in its broad sense to mean an electronic medium for the recording, copying, playback, broadcasting, and display of moving or unmoving visual or other types of media. FIG. 1 also shows various output data sets that result from different functional blocks shown in FIG. 1. These data sets may not be considered to be part of the actual system but are shown in FIG. 1 for illustration purposes.

The system takes as its input a digital media file, which in this example is a video or motion picture file 3, which is fed into a data pre-processing unit 5. The data pre-processing unit 5 is configured to pre-process the input video file as will be explained later in more detail and output a sequence or stream of image frames 7, audio clips 9 and text portions or words 11, which may be subtitles, a video summary, a script, reviews etc related to the audio frames and/or audio clips. The sequences of audio clips, image frames and words are also referred to as a first data stream, a second data stream and a third data stream, although not necessarily in this particular order. The audio clips, image frames and text portions represent different content forms or types. The pre-processing unit may thus output a data stream consisting of image and audio signals as well as any textual input related to the image and/or audio signals. The system further comprises an audio and image processing block or unit 13 for converting or transforming a respective sequence of audio clips and image frames into a respective single audio and image feature vector 15, a text processing block or unit 17 for converting or transforming a respective sequence of words into a respective single text feature vector 19, a classifier block or unit 21 for generating a probability score or vector 25 for a concatenated audio, image and text vector 23 to obtain an estimated age suitability class, and a post-processing block or unit 27 for using the result of the estimation to take an action depending on the estimated classification. The audio and image processing unit 13, the text processing unit 17 and the classifier unit 21 together form an artificial neural network system.

The audio and image processing unit 13 comprises a set of first artificial neural networks, which in this example are convolutional neural networks (CNNs) 29 trained for image processing and referred to as a set of image CNNs. The image CNNs receive at their inputs the sequence of image frames 7 (four image frames in the example shown in FIG. 1), such that one image CNN 29 is arranged to receive and process one image frame. The image input is a sequence of t consecutive frames separated by a time duration s, which may be e.g. between 0.1 seconds and 10 seconds or more specifically between 0.5 seconds and 3 seconds. Each one of the image CNNs 29 is arranged to process the received image frame and output an image feature vector 31. Thus, the number of image feature vectors 31 output by the set of image CNNs equals the number of image CNNs in the set. The output is a sequence of t image feature vectors of size D1. In the present description, by a feature vector is understood a vector that contains information describing an object's important characteristics. In other words, a feature vector is a vector of characters, and more specifically numbers, describing the object. The audio and image processing unit 13 also comprises a set of second artificial neural networks, which in this example are CNNs 33 trained for audio processing and/or recognition and referred to as a set of audio CNNs. The audio CNNs receive at their inputs the sequence of audio clips 9 of a given length (four audio clips in the example shown in FIG. 1), such that one audio CNN 33 is arranged to receive one audio clip. In this example, the audio input is a sequence of t audio clips with a duration, which equals s in this particular example. Each one of the audio CNNs 33 is arranged to process the received audio clip and output an audio feature vector 35. Thus, the number of audio feature vectors 35 output by the set of audio CNNs equals the number of audio CNNs in the set. The output is a sequence of t audio feature vectors of size D2, which typically is not the same as D1.

The audio feature vectors and the image feature vectors are then arranged to be fed into a first concatenation unit 37, which is configured to concatenate these two feature vectors. More specifically, the concatenation unit is configured to take an audio feature vector and append the corresponding (timewise) image feature vector to it or vice versa. In this manner the audio feature vectors and the image feature vectors can be merged so that the number of the concatenated audio and image feature vectors 39 equals the number of audio feature vectors 35 or the number of image feature vectors 31 in the sequence. Thus, the output of the first concatenation unit is a sequence of t concatenated audio and image feature vectors of size D1+D2. The concatenated audio and image feature vectors 39 are then fed into a third artificial neural network 41, which in this example is a first convolution through time (CTT) network, which is a one-dimensional CNN. The CTT network applies a succession of one-dimensional convolution filters to extract temporal information from the input sequence. In other words, the CTT network consists of a series of one-dimensional convolution layers, the convolution being applied to the temporal dimension. The input sequence of concatenated audio and image feature vectors (size (t, D1+D2) thus goes through the first CTT network consisting of a series of one-dimensional convolution layers. The first CTT network 41 is thus configured to process the incoming concatenated audio and image feature vectors to output the single image and audio feature vector 15, which indirectly describes the sequences of audio feature vectors and image feature vectors.

The operation of the text processing unit 17 is similar to the audio and image processing unit 13 with the main difference that there is no need to carry out a concatenation operation within the text processing unit 17. The text processing unit 17 comprises a set of text processing elements 43, which in this example are word embedding matrices 43 trained for text or word processing. Word embedding is the collective name for a set of feature learning techniques and language modelling in natural language processing where words or phrases from the vocabulary are mapped to vectors of real numbers. Conceptually it typically involves a mathematical embedding from a space with one dimension per word to a continuous vector space with a much lower dimension. The word embedding matrices receive at their inputs the sequence of words 11, such that one word embedding matrix 43 is arranged to receive and process one word. Each one of the word embedding matrices 43 is arranged to process the received word and output a text feature vector 45 for the received word. In this example, each word embedding matrix is configured to process one word. Thus, the number of text feature vectors 45 output by the set of word embedding matrices 43 equals the number of word embedding matrices in the set. The text feature vectors 45 are then arranged to be fed into a fourth artificial neural network 47, which in this example is a second convolution through time (CTT) network, (which is a one-dimensional CNN similar to the first CTT network, however with different operating parameters compared with the first CTT network). The second CTT network 47 is configured to process the incoming text feature vectors to output the single text feature vector 19. It is to be noted that the first and second CTT networks 41, 47 could be merged into one single CTT system. It is to be noted that instead of using the first and second CTT networks, a first and second recurrent neural networks (RNNs) could be used, for example with long-short term memory units (LSTM), where connections between nodes form a directed graph which contains a cycle. These networks exhibit a memory effect, which make them particularly efficient for sequence and time series classification problems.

Regarding the first and second CTT networks, they each comprise a series of $n_{conv}$ one-dimensional convolutional layers with $f_1, f_2, \ldots, f_{n_{conv}}$ filters of kernel sizes $k_1, k_2, \ldots, k_{n_{conv}}$, respectively. After each convolutional layer i, the length $t_i$ of the sequence is reduced according to the size of the kernel $k_i$: $t_i = t_{i-1} - k_i + 1$. After the last convolution layer $n_{conv}$, a max pooling operation is applied over the remaining sequence of length $t_{n_{conv}}$ to obtain a single feature vector of size $f_{n_{conv}}$ encoding the full sequences of audio and images, and text. The max pooling is a sample-based discretisation process whose objective is to down-sample an input representation, reducing its dimensionality and allowing for assumptions to be made about features contained in sub-regions binned. It is also possible to use CTT networks having only one layer. Furthermore, the kernel size(s) of the second CTT network (for the text processing) may be smaller, although not necessarily, than the kernel sizes for the first CTT network. The kernel sizes may by determined and/or optimised through training of the CTT networks. The kernel size of each layer in this example equals at most t, in other words $k \leq t$, where t denotes the number of image frames (or audio clips) in a sequence fed into the first CTT network 41.

The audio clips and the image frames are typically synchronised in the time domain in a given sequence. However, this does not have to be the case. More specifically, the audio clips may be taken at regular (or irregular) time intervals with a given time separation T between any two consecutive image frames. The audio clips then have the same time duration T. The word stream fed into the text processing unit then includes all the words present in the video during this sequence of frames or audio clips. Thus, the number of image frames during a given sequence in this example equals the number of audio clips. The number of words is however typically different from the number of frames or number of audio clips in a given sequence.

The system also comprises a second concatenation unit 49, which in the example illustrated in FIG. 1 is part of the classifier unit 21. The single audio and image feature vector and the single text feature vector are arranged to be fed into the second concatenation unit 49 which is configured to concatenate these two feature vectors to output the concatenated audio, image and text feature vector. It is to be noted that the first and second concatenation units 37, 49 may form one single processing unit. In other words, the same concatenation unit may be used for carrying out the first and second concatenation operations in the system. The concatenated audio, image and text feature vector 23 is then arranged to be fed into a fifth artificial neural network 51, which in this example is a feedforward artificial neural network and more specifically a multilayer perceptron (MLP) network. The MLP may also be considered as a series of linear regression units and non-linear activation units arranged to model the relationship between a scalar response (or dependent variable) and one or more explanatory variables (or independent variables).

The MLP 51 is configured to output the probability vector 25 that is configured to be fed into the post-processing unit 27, which is arranged to assign the age suitability class to the video scene under consideration based on the probability vector 25 as will be described later in more detail. The MLP uses $n_{dense}$ fully connected layers of sizes $d_1, d_2, \ldots, d_{n_{dense}}$, where $d_x$ denotes the number of nodes or neurons in the layer. The last layer of this fully connected network is a dense layer having a size equalling the number of target ratings or in this example the age suitability classes $n_{classes}$ in the system. The output vector of length $n_{classes}$ can then be transformed into the class probability vector 25 by applying a softmax activation function. The softmax function, also known as softargmax or normalised exponential function, is a function that takes as input a vector of M real numbers, and normalises it into a probability vector consisting of M probabilities. That means that prior to applying the softmax function, some vector components could be negative, or greater than one, and might thus not sum to 1. After applying softmax, each component will be in the interval (0,1), and the components will add up to 1, so that they can be interpreted as probabilities. It is to be noted that the activation function applied to the output vector is the softmax function if a single label is needed (age suitability classes) and a sigmoid function for a multi-label classification.

In this specific example the MLP consists of two layers of nodes or neurons. The first and input layer is a fully connected layer, while the second and output layer is also a fully connected layer. It is to be noted that instead of the MLP having two layers, any other suitable number of layers is possible. For example, there could be any suitable number of hidden layers between the input and output layers. Except for the input nodes, each node is a neuron that uses a nonlinear activation function. MLPs use a supervised learning technique called backpropagation for training. MLPs can distinguish data that are not linearly separable.

Figure 2:
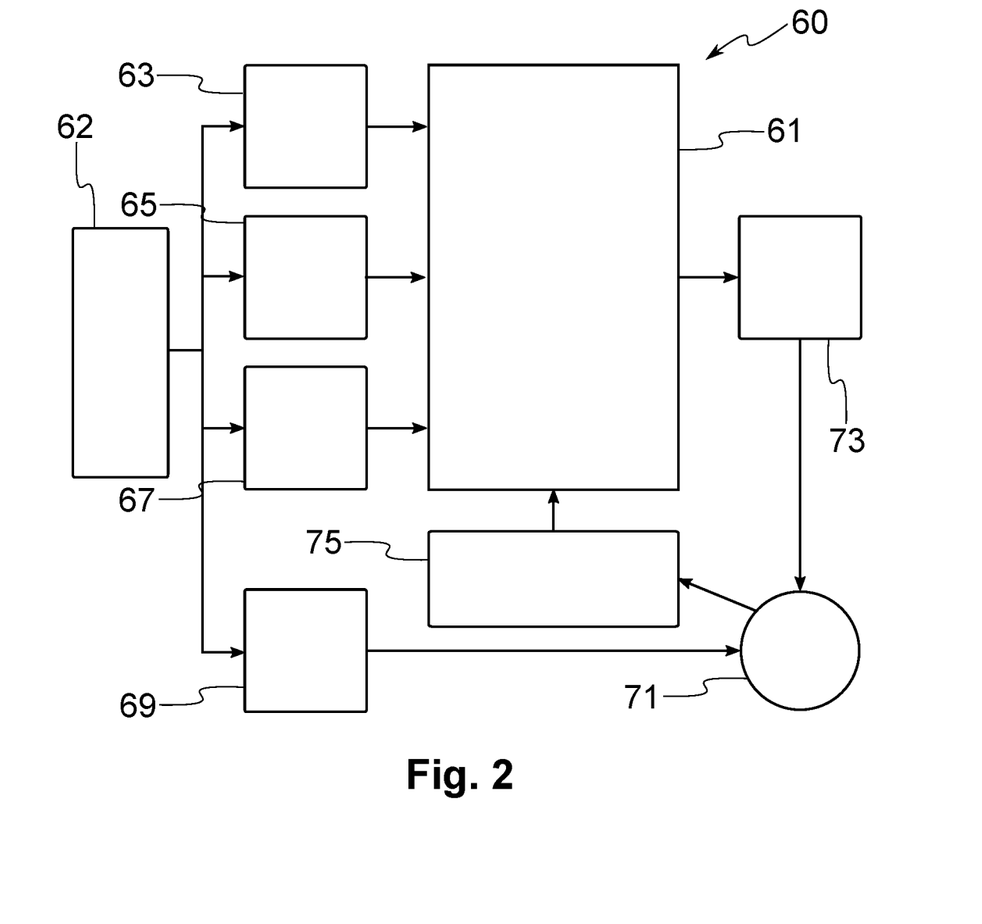
FIG. 2 is a block diagram schematically illustrating a training arrangement of an artificial neural network system used in the classification system according to an example of the present invention.

Before the operation of the system 1 is explained in more detail, the training of the system is first briefly explained with reference to the block diagram of FIG. 2 describing a training system 60. The training may for instance follow the principles explained in the publication: D. P. Kingma and J. Ba, "Adam: A Method for Stochastic Optimization," ArXiv14126980 Cs, December 2014. During the training phase, the system 1 or more specifically the artificial neural network system 61 consisting of the audio and image processing unit 13, the text processing unit 17 and the classifier unit 21 is trained by using labelled data, i.e. labelled videos 62, to classify video scenes into age suitability classes. From the labelled videos, the following streams are extracted: an image stream 63, an audio stream 65 and a text stream 67. These streams are fed into the system 61. An age label rating 69 of the extracted streams is also extracted from the labelled video and fed to a loss function computation unit 71. The system 61 outputs a class probability vector 73 (or an age rating probability prediction) for the received streams. The class probability vector is then fed into the loss function computation unit 71, which is configured to compare the class probability vector 73 and the age rating label 69 assigned to the stream and it thereby aims to minimise the loss function. The output of the loss function computation is fed into a parameter optimisation unit 75, which is configured to optimise the parameters of the system 61 based on the output of the loss function computation.

The proposed method is able to achieve high accuracy thanks to training the system by using a relatively small dataset of labelled videos by leveraging a technique of transfer learning. More specifically, high level audio, image and text features are extracted from the audio, image and text inputs, respectively, by using pre-trained neural networks which achieve high accuracy on audio, image and text classification tasks. These pre-trained networks are used to extract temporal sequences of feature vectors from the audio, image and text inputs. The present invention then makes use of deep learning sequence classification methods, such as one-dimensional CNNs (i.e. the CTTs) to classify these feature vector sequences into age suitability classes. By using transfer learning, only the parameters of the sequence classification network (i.e. the CTTs 41, 47 and the MLP 51) need to be optimised for the specific task at hand, while the parameters used for optimal audio, image and text feature extraction can remain fixed (i.e. the image CNNs 29, the audio CNNs 33 and the word embedding matrices 43). Using this technique, it is possible to train an accurate model on a dataset consisting of 1000 to 100000 videos, or more specifically of 5000 to 20000 videos. Nonetheless, if a larger dataset is available for a specific task, the full system 61 can be trained directly.

Figure 3:
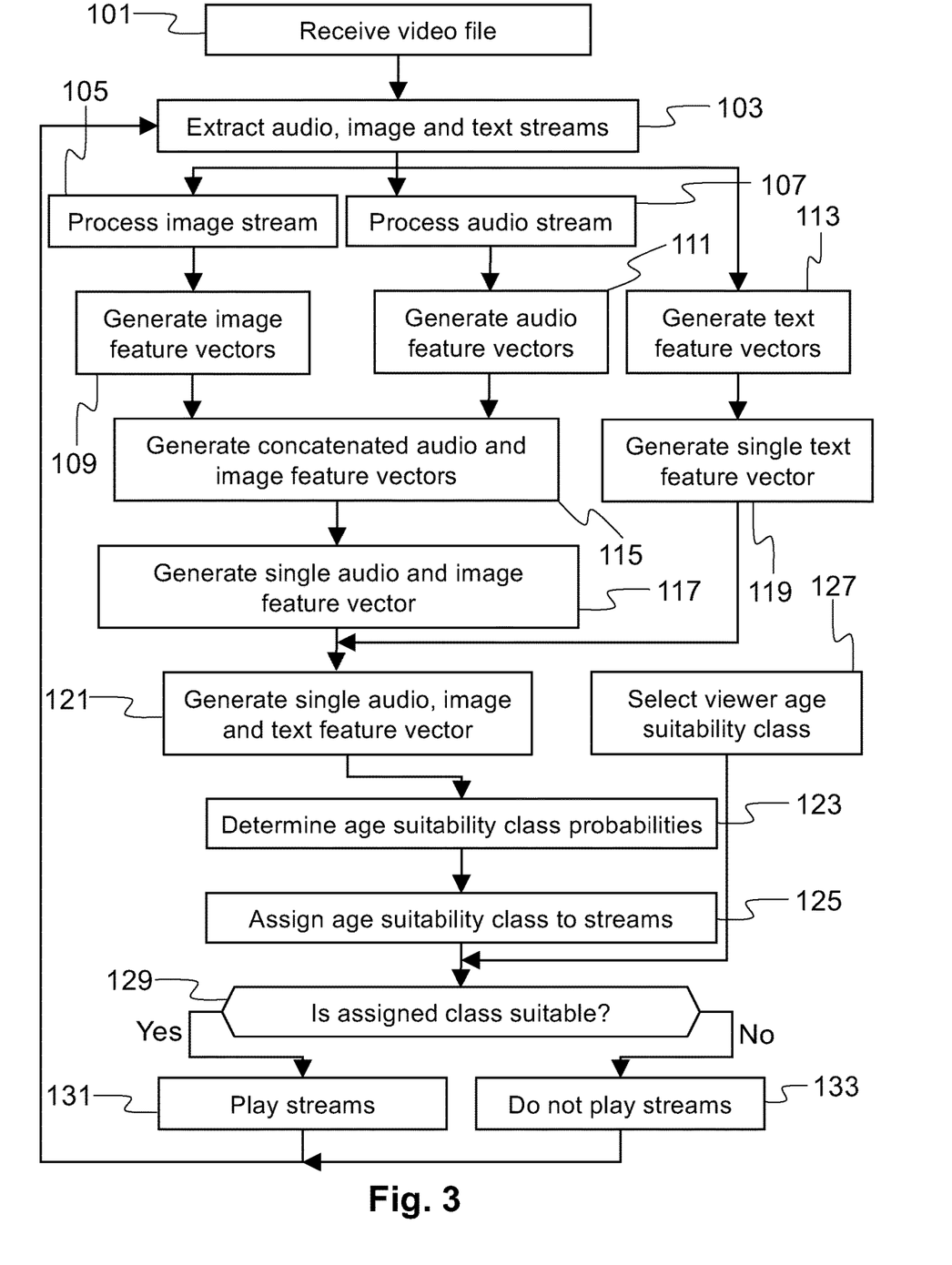
FIG. 3 is a flow chart summarising a method of classifying a media item according to an example of the present invention.

The operation of the classification system 1 is next explained in more detail with reference to the flow chart of FIG. 3. In step 101, a digital media file, which in this example is a video file 3, is received and read by the pre-processing unit 5. In step 103, the pre-processing unit cuts or extracts three data streams, namely a sequence of audio clips, image frames and the text portions from the received file. The extracted streams are then stored in the pre-processing unit or in any suitable storage. For example, the image stream may be stored in any desired colour space format, such as the RGB colour format, as an image tensor of integers. Thus, the image tensors as stored may have the size ("number of pixels in the height direction, i.e. image height", "number of pixels in the width direction, i.e. image width" and "number of colour space components"). The image height and width would typically be between 0 and 255. In step 105, the pre-processing unit processes the sequence of image frames. More specifically, in this step the image frames are cropped and/or resized so that they can be processed by the image CNN 29. Thus, the images may be cropped to remove any possible black bars around the images, e.g. at the top and bottom. In the present example, the images are resized to the input size of the pre-trained network, such that in this example the images have a size of (224, 224, 3).

In step 107, which may be carried out in parallel with step 105, the sequence of audio clips is pre-processed. More specifically, the pre-processing unit 5 obtains a spectrogram for each audio clip in the sequence of audio clips. In this example, the obtained spectrogram is a log mel spectrogram tensor. More specifically, step 107 may comprise at least some of the following operations:

The audio clips are resampled, in this example to 16 kHz.

A short-term Fourier transformation is performed, in this example with a periodic Hann window size of 25 ms, and a hop, such as a 10 ms hop, is computed for each audio clip, to obtain the spectrograms.

The spectrograms are mapped to mel bins, in this example to 64 bins, in the 125-7500 Hz range and a logarithmic function is applied to the mel spectrogram amplitude, optionally with a small offset of 0.01 for example to avoid the zero singularity.

In step 109, the image frame stream is fed into the image CNNs 29 and a sequence or set of image feature vectors is generated from the image stream by the image CNNs 29 such that in this example one image feature vector is generated per one image frame. In step 111, which may be carried out in parallel with step 109, the audio clip stream is fed into the audio CNNs 33, and a sequence or set of audio feature vectors is generated from the audio stream by the audio CNNs 33 such that in this example one audio feature vector is generated per one audio clip or frame. In step 113, which may be carried out in parallel with steps 109 and 111, the text stream is fed into the word embedding matrices 43, and a sequence or set of text or word feature vectors is generated from the word stream by the image word embedding matrices 45 such that in this example one word feature vector is generated per one text portion or word. It is to be noted that in this example there is no need to pre-process the text stream but depending on the capabilities of the word embedding matrices, pre-processing of the text may be performed if needed prior to carrying out step 113.

In step 115, a sequence or set of concatenated audio and image feature vectors 39 is generated from the sequence of audio feature vectors and from the sequence of image feature vectors by the first concatenation unit 37. This is carried out in this example so that a first audio feature vector of a first time instant is concatenated with a first image feature vector of the first time instant, a second audio feature vector of a second time instant is concatenated with a second image feature vector of the second time instant, etc. In step 117, a single audio and image feature vector 15 is generated from the sequence of concatenated audio and feature vectors by the first CTT network 41. In other words, only one concatenated audio and image feature vector is generated, which describes all the concatenated audio and image feature vectors in a given sequence or stream. In step 119, which may be carried out in parallel with step 115 or 117, a single text feature vector 19 is generated from the sequence of text feature vectors by the second CTT network 47. In other words, only one text feature vector is generated, which describes all the text feature vectors in a given sequence or stream.

In step 121, the second concatenation unit 49 (or the first concatenation unit 37) concatenates the single audio and image feature vector and the single text feature vector to obtain a single concatenated audio, image and text feature vector 23 describing the three data streams output by the pre-processing unit 5. In step 123, the MLP 51 determines age suitability class probabilities by using the single concatenated audio, image and text feature vector 23. In other words, a vector of probabilities is computed or determined so that the number of entries in the vector equals the number of possible age suitability categories. In this manner, one probability value is allocated to each age suitability category. If there are for instance five different age suitability categories, then the probability vector could be for example [0.0, 0.1, 0.0, 0.8, 0.1].

In step 125, an age suitability class is assigned to the data stream under consideration. This step may be carried out by the post-processing unit 27. In other words, in this step, a sequence or stream classification is carried out. In practice, this step may be implemented so that that the highest probability value is selected from the probability vector and the assigned age suitability class is the class corresponding to that probability value. In step 127, the viewer age suitability class or classes is/are selected or the selection is received by the post-processing unit 27. It is to be noted that this step may be carried out at any moment prior to carrying out step 129. In step 129, it is determined whether or not the assigned age suitability class is compatible with the selection received in step 127. More specifically, it is determined whether or not the assigned age suitability class is the same as the selected age suitability class or is within the range of the allowed age suitability classes for this user or viewer. In the affirmative, in step 131, the stream is displayed or played to the viewer and the process then continues in step 103. If the assigned class is not compatible with the selection, then in step 133, it is decided not to show the stream in question to the viewer. After this step, the process continues in step 103 where the following streams are extracted. The process may be then repeated as many times as desired, and it can be stopped at any moment. More specifically, once the first sequence has been processed consisting of t audio and image frames and a first number of words, then the process continues to a second or next image frame and/or audio clip and includes these items and a given number of subsequent audio frames, audio clips and words into the next sequence. The length of this sequence may or may not be equal to t. Once this sequence has been processed, then the third or next sequence would start with a third or next audio clip or image frame. Alternatively, the process can be run so that once the first sequence of t audio clips and image frames has been processed, then the first audio clip or image frame of the following sequence would be (t+1)th audio clip or image frame.

It is to be noted that multiple streams may first be processed before deciding whether or not the stream(s) should be displayed to the viewer. Thus, after step 125 or 129, the result of every determination may be stored in a database or memory and in this manner, only once a given number of streams (for example corresponding to the length of an entire film) have been assessed, step(s) 131 and/or 133 are carried out. In this manner, it is possible to filter incompatible scenes from a film and show the rest of the film to the user as a continuous sequence of scenes for example or so that the incompatible scenes have been modified to so that they comply with the class selection. In this case, a slightly modified film may be displayed to the viewer. For instance, it is possible to show all the image frames of a film to the viewer but so that some of the audio clips and/or text portions having unsuitable content are not played or vice versa. The incompatible audio content could simply be replaced with a muted content for example. The system may also determine which one of the assessed streams contributes most to the incompatible age suitability class. In other words, the system may rank the assessed streams according to their contribution to the estimated age suitability class. Then, for example, the stream having the greatest contribution may be modified or its playback prevented for a particular scene.

An embodiment was described above for classifying multimedia content. Combining the deep learning audio, image and text methodologies, an artificial neural network was developed to detect directly and dynamically the age suitability of the multimedia content. The invention thus provides a dynamic media or video filter, which can understand dynamically the suitability of content for age groups according to the criteria of the motion picture age classification of different countries. And this can be implemented per scene, multiple scenes or even for the entire film. The system can be plugged in a video player or be part of it and it allows a user to watch the films with/without content incompatible with the user class. Thus, the proposed solution can be integrated into a parental control application in an electronic device capable of rendering multimedia files. It is to be also noted that the audio, image and text streams can be fused at different points in the system, i.e. before or after the sequence classification performed by the MLP 51. For example, if the number of audio and image frames is not the same in a given sequence, then the audio feature vectors and the image feature vectors would typically be fused after the first CTT 41. It is also to be noted that it is not necessary to use all the three streams for the content classification. Instead, only one or any one of the two streams may be used for this purpose. However, the reliability of the end result would typically increase with the increasing number of considered streams.

The geographical location of the playback device and/or the viewer may also advantageously be taken into account when determining whether or not play the media content to the viewer and how or in which format. The geographical location may be determined by satellite positioning or by using an identifier or network address, such as an internet protocol (IP) address, of the playback device. If the playback device is a cellular communication device, such as a smart phone, the cell identity may also be used for this purpose. More specifically, the geographical location of the playback device (or the classification system, which may be part of the playback device) or the viewer may affect the age suitability class given for the media content. This means that also the values of the probability vector may be dependent on the above geographical location.

For implementing the above teachings, the actual computing system may comprise a central or computing processing unit (CPU), a graphical processing unit (GPU), a memory unit and a storage device to store digital files. When processing a multimedia stream, the parameters and the operating software of the neural network system are first loaded from the storage to the memory. The multimedia item (in this example comprising audio, image and text components) or the input file may be analysed and loaded from the storage to the memory. The age rating predictions for the multimedia item are calculated by software modules running on the CPU and GPU and using the neural network system parameters. The software modules are operable for (a) decomposing the input multimedia file into sequences of audio clips, image frames and words to be classified or rated, (b) pre-processing the input file into numerical tensors used as input for the neural network, (c) computing the age rating prediction for each tensor or for a sequence of tensors by applying the successive convolution, linear regression and activation function operations of the neural networks using the parameters loaded into the memory. The final age ratings predictions are stored in the storage. The modified or unmodified video may then be displayed if so decided on a display or screen optionally alongside the predicted dynamic age ratings. The display may for instance be directly or indirectly connected to the post-processing block or unit 27. The displayed video can be filtered in real time to show only the sequences with suitable age ratings.

It is to be noted that instead of classifying the content into age suitability classes, the content could be classified into user profile suitability classes. In this case, a set of different user profiles may be created in the system and a respective user may be allocated a user profile. Users may be able to select by themselves their user profile or the system may automatically select the user profiles for the users based on some information including e.g. viewing preferences and/or the age of the users. Thus, one parameter of the user profile may be e.g. the age of the user. In this manner, a given age class, such as an adult age class, may include several profiles or sub-categories (e.g. one profile may accept violence to a certain extent but no pornographic content).

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. It is to be noted that some of the steps present in the flow chart of FIG. 2 are optional. Furthermore, the order of the steps may be interchanged.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A computer implemented method of classifying a media item into one or more user profile suitability classes in a classification system comprising a set of pre-trained artificial neural networks, the method comprising:
   receiving a media file;
   extracting a first data stream and a second data stream from the media file, the first media stream comprising first media content of a first media content form, the second data stream comprising second media content of a second, different media content form, the first and second data streams being comprised in the media item, the first content form being one of the following content forms: audio, image and text, while the second media content form being any one of the remaining two content forms;
   generating a first sequence of first feature vectors describing the first media content, the first sequence of first feature vectors being generated by a first set of convolution neural networks;
   generating a second sequence of second feature vectors describing the second media content, the second sequence of second feature vectors being generated by a second set of convolution neural networks or by a set of word embedding matrices;
   generating at least a first single feature vector representing the first sequence of first feature vectors and the second sequence of second feature vectors, or generating at least a first single feature vector representing at least the first sequence of first feature vectors, and generating a second single feature vector representing at least the second sequence of second feature vectors;
   generating a probability vector at least from the first single feature vector in the case where the first single feature vector represents the first sequence of first feature vectors and the second sequence of second feature vectors, or at least from the first and second single feature vectors by first concatenating the first and second single feature vectors in the case where the first single feature vector represents at least the first sequence of first feature vectors, and the second single feature vector represents at least the second sequence of second feature vectors, the probability vector being generated by a feedforward artificial neural network; and
   assigning a user profile suitability class to the media item based on the probability vector.

2. The method according to claim 1, wherein the method further comprises determining whether or not to play the media item to the user based on the assigned profile suitability class.

3. The method according to claim 2, wherein in the case where the media item is played to the user, the method comprises modifying a content of the media item before playing the content to the user.

4. The method according to claim 1, wherein the method further comprises classifying a succession of the media items according to the method according to any one of the preceding claims, and playing only the media items to the user whose assigned user profile suitability class is compatible with a user allocated suitability class.

5. The method according to claim 1, wherein the values in the probability vector depend on a geographical location of the classification system and/or a playback device used for playing the media item.

6. The method according to claim 1, wherein the method further comprises
   extracting a third data stream comprising third media content of a third media content form, the third data stream being comprised in the media item;
   generating a third sequence of third feature vectors describing the third media content;
   generating a second single feature vector representing the third sequence of third feature vectors in the case where the first single feature vector describes the first sequence of first feature vectors and the second sequence of second feature vectors, or concatenating the third sequence of third feature vectors with the first sequence of feature vectors in the case where the first single feature vector describes at least the first sequence of first feature vectors, and the second feature vector describes at least the second sequence of second feature vectors.

7. The method according to claim 6, wherein the third content form is the one remaining content form.

8. The method according to claim 1, wherein the media file comprises a video file.

9. The method according to claim 1, wherein the first sequence of first feature vectors is generated by a first set of convolution neural networks, while the second sequence of second feature vectors is generated by a second set of convolution neural networks or by a set of word embedding matrices.

10. The method according to claim 1, wherein
the first single feature vector is generated by a first convolution through time artificial neural network or by a first recurrent artificial neural network; or
the first single feature vector is generated by a first convolution through time artificial neural network or the first recurrent artificial neural network, and the second single feature vector is generated by a second convolution through time artificial neural network or a second recurrent artificial neural network.

11. The method according to claim 10, wherein the first and/or second convolution through time artificial neural network(s) is/are (a) single layer artificial neural network(s) having one convolution layer or (a) multi-layer artificial neural network(s) having at least two convolution layers.

12. The method according to claim 11, wherein the convolution layer(s) has/have a kernel size k≤t, where t denotes the number of image frames or audio clips in the first data stream and/or in the second data stream.

13. The method according to claim 1, wherein the feedforward artificial neural network is a multilayer perceptron.

14. The method according to claim 1, wherein the feedforward artificial neural network comprises a given number of fully connected artificial neuron layers.

15. The method according to claim 14, wherein the feedforward artificial neural network is a two-layer artificial neuron network having an input layer and an output layer.

16. The method according to claim 1, wherein the feedforward artificial neural network comprises a given number of fully connected artificial neuron layers, and wherein the last layer has a size equalling the number of target user profile suitability classes in the classification system, the size being measured in number of artificial neurons.

17. The method according to claim 1, wherein the probability vector is obtained by applying a softmax activation function to an output vector of the feedforward artificial neural network.

18. The method according to claim 1, wherein the probability vector has a size equalling the number of target user profile suitability classes in the classification system such that each element in the probability vector corresponds to a given target user profile suitability class, and wherein each element in the probability vector gives an estimated probability that the media item belongs to a respective target user profile suitability class assigned to a respective element.

19. The method according to claim 1, wherein the method further comprises processing the first data stream and/or the second data stream before generating the first sequence of first feature vectors and/or the second sequence of second feature vectors, and wherein the processing comprises resizing first media content items of the first data stream and/or generating spectrograms for second media content items of the second data stream.

20. The method according to claim 1, wherein the method further comprises training the classification system prior to receiving the media file, wherein the classification system is trained with labelled media items, the label indicating the user profile suitability class for the respective labelled media item.

21. The method according to claim 1, wherein the user profile suitability class is assigned to the media item by selecting the highest probability value from the probability vector and assigning that value to the media item.

22. The method according to claim 1, wherein the user profile suitability class comprises a user age suitability class.

23. A computer program product comprising instructions stored on a non-transitory medium for implementing the steps of the method according to claim 1 when loaded and run on computing means of an electronic device.

24. A classification system for classifying a media item into one or more user profile suitability classes, the system comprising a set of pre-trained artificial neural networks and being configured to perform operations comprising:
receive a media file;
extract a first data stream and a second data stream from the media file, the first media stream comprising first media content of a first media content form, the second data stream comprising second media content of a second, different media content form, the first and second data streams being comprised in the media item, the first content form being one of the following content forms: audio, image and text, while the second media content form being any one of the remaining two content forms;
generate by a first set of convolution neural networks a first sequence of first feature vectors describing the first media content;
generate by a second set of convolution neural networks or by a set of word embedding matrices a second sequence of second feature vectors describing the second media content;
generate at least a first single feature vector representing the first sequence of first feature vectors and the second sequence of second feature vectors, or generating at least a first single feature vector representing at least the first sequence of first feature vectors, and generating a second single feature vector representing at least the second sequence of second feature vectors;
generate by a feedforward artificial neural network a probability vector at least from the first single feature vector in the case where the first single feature vector represents the first sequence of first feature vectors and the second sequence of second feature vectors, or at least from the first and second single feature vectors by first concatenating the first and second single feature vectors in the case where the first single feature vector represents at least the first sequence of first feature vectors, and the second single feature vector represents at least the second sequence of second feature vectors; and
assign a user profile suitability class to the media item based on the probability vector.

* * * * *